Sept. 20, 1960     B. T. FREURE     2,953,503

METHOD FOR THE PURIFICATION OF N,N-DIMETHYLACETAMIDE

Filed Aug. 10, 1956

INVENTOR.
BENJAMIN T. FREURE

BY *Walter C. Rehm*

ATTORNEY

United States Patent Office 2,953,503
Patented Sept. 20, 1960

2,953,503
METHOD FOR THE PURIFICATION OF N,N-DIMETHYLACETAMIDE

Benjamin T. Freure, Charleston, W. Va., assignor to Union Carbide Corporation, a corporation of New York Filed Aug. 10, 1956, Ser. No. 603,233

13 Claims. (Cl. 202—42)

This invention relates to the purification of N,N-dimethylacetamide. More specifically, it is directed to a process for the recovery of N,N-dimethylacetamide from a mixture containing N,N-dimethylacetamide and acetic acid.

Among the methods employed for the production of N,N-dimethylacetamide are the reaction of acetic acid and dimethylamine and the reaction of methyl or ethyl acetates and dimethylamine in the presence of water. Both of these methods result in a mixture containing large amounts of acetic acid, which is not easily separated from the N,N-dimethylacetamide, presumably because of a hydrogen-bonding effect between acetic acid and N,N-dimethylacetamide. The N,N-dimethylacetamide, in the presence of acetic acid, acts as a weak base and exerts a strong attraction for the acid. According to one theory this attraction is caused by the donation of an electron on the nitrogen atom to the acid. This type of attraction has been termed "hydrogen-bonding." Because of this attraction, separation of the acid from the amide is difficult by ordinary physical means, particularly by distillation. According to one possible explanation, this attraction may create a series of maximum constant-boiling mixtures of the dimethylacetamide with acetic acid so as to make ordinary distillation procedures unsuitable.

It is reported by Ruhoff and Reid in J. Am. Chem. Soc., 59, 401 (1937) that at atmospheric pressure one of the maximum boiling mixtures of acetic acid and N,N-dimethylacetamide boiling at 170.3° C., contains about 21.1 percent acetic acid. Other maximum constant-boiling mixtures exist at different temperatures, pressures, and concentrations of acetic acid. For example, I have observed at 50 mm. mercury pressure, a maximum boiling azeotrope containing 30 percent acetic acid which boils at 93° C., and at 10 mm. mercury pressure, a maximum boiling azeotrope which contains 41.7 percent acetic acid, and boils at 75° C.–76° C. Thus it appears that in distillation operations, the final distillate will contain between 20 and 40 percent acetic acid.

Azeotropic distillation has found little or no commercial application for the separation of either component from such a mixture. While a great number of azeotropic compositions are known to exist between acetic acid and other compounds, apparently none that have thus far been suggested have been effective in interrupting or breaking up this bonding effect, at least not to a degree sufficint to permit separation of one of the components substantially free of the other. This bonding is a strong force and it was to be expected that only a highly polar compound would be effective in breaking it.

Chemical means, such as the neutralization of the acetic acid with caustic, have been used to tie up the acetic acid in the mixture so that the N,N-dimethylacetamide can be distilled off in relatively pure form. This method does not lend itself to any extensive use outside of laboratory applications. Such a method is not commercially desirable. Accumulation of solid sodium acetate in the still kettle tends to prevent good heat transfer, and creates difficulties in handling the crystalline mixtures. Filtering or centrifuging such mixtures is expensive and generally results in loss of the valuable N,N-dimethylacetamide.

For most uses of the N,N-dimethylacetamide, it is desirable, if not necessary, that the compound be substantially pure or at least free of acetic acid. This amide has a potentially wide market as a spinning solvent for synthetic fibers, and as a solvent in insecticide formulations. It also can be used as an inert medium for organic reactions. In such applications the presence of acetic acid would be objectionable to desired results and in most cases can not be tolerated.

The present improvement is based on my discovery that a mixture of acetic acid and N,N-dimethylacetamide can be resolved by heating the mixture in the presence of a non-polar, substituted benzene to a temperature sufficient to vaporize the acetic acid and substituted benzene, and recovering the N,N-dimethylacetamide from the residue. The non-polar, substituted benzenes I have found effective in this process are chlorobenzene and the lower alkylbenzenes such as toluene, ethylbenzene, and the xylenes, including the position isomers of xylene. By the use of these compounds in amounts at least sufficient to form an azeotropic mixture with substantially all of the acetic acid in the mixture, the acetic acid can be removed and the dimethylacetamide recovered in nearly pure form, i.e. generally containing less than about 0.05 percent acetic acid.

The reason why such non-polar compounds as toluene, ethylbenzene, chlorobenzene, and the xylenes are able to overcome this hydrogen-bonding effect is not completely understood. It is likewise not fully understood why other compounds known to be excellent azeotrope-formers for acetic acid are not effective in this separation. For example, such known azeotrope-forming compounds as dioxane, acetamide, and the tertiary amines are not effective. Likewise benzene, alpha-picoline and epichlorohydrin are not successful. Other known entraining agents, for example, dibutyl ether, and such similar compounds as methylcyclohexane, dimethylcyclohexane, ethylcyclohexane, and pinene are only slightly effective in this separation. It is only with extreme difficulty that such latter compounds are able to reduce the acetic acid content to below about five percent.

Theoretically, most of these compounds found to be ineffective could be expected to be more effective than the substituted benzenes in this separation. They are known to form with acetic acid azeotropes which contain a higher concentration of acid than is present in the mixtures encountered in my process. Apparently they are not effective for interrupting the hydrogen bonding effect between the acid and the amide.

In order to remove all or substantially all of the acetic acid in the mixture to be resolved, it is preferred that the substituted benzene be employed in amounts at least sufficient to form the azeotrope with substantially all of the acetic acid in the mixture. An excess of the substituted benzene over this amount is preferred for best operation, with amounts from about one to about six times the amount of acetic acid in the mixture to be separated being especially preferred, although still greater amounts can be employed. The excess entraining agent which is not used in removing the acetic acid can be distilled over after removing the azeotropic mixture or can be removed with another entraining agent, for instance, water.

If desired, the substituted benzene can be employed in amounts less than that necessary to remove all of the acetic acid present, which would permit a part of the acid to be removed as the azeotrope, thus decreasing the concentration of acid in the still. Nearly pure dimethylacetamide containing less than 0.1 percent acid can then be distilled from the resulting mixture since it boils at a temperature sufficiently lower than the maximum boiling azeotrope of dimethylacetamide and acetic acid to allow good separation. Recovery of the dimethylacetamide can then be continued until the concentration of acetic acid in the still again reaches the composition of the maximum boiling azeotropic mixture. More of the substituted benzene can then be added to remove more acid, followed by distillation of more of the dimethylacetamide.

The temperature at which this distillation is conducted is not narrowly critical, being dependent upon the particular substituted benzene used, the operating pressure, and the operating characteristics of the distillation equipment. For best results, I prefer to operate the process in a conventional still kettle topped with a rectifying column of at least about ten theoretical plates, maintaining the temperature in the still kettle at a temperature between about the boiling temperature of the acetic acid-substituted benzene azeotropic mixture and the boiling point of the dimethylacetamide, and removing overhead only the acetic acid and substituted benzene. With these substituted benzenes, i.e., toluene, ethylbenzene, chorobenzene, and xylenes, a kettle temperature of at least 120° C. and a corresponding head temperature of at least 100° C. should preferably be maintained.

At atmospheric pressure, for instance, the azeotrope of acetic acid and ethylbenzene (containing 66 percent acetic acid) boils at about 114.7° C. Thus when employing this substituted benzene, temperatures of about 115° C. to about 140° C. at the head of the column are preferred. At temperatures above about 140° C., the amount of acetic acid in the distillate is reduced, and efficiency of the process is curtailed.

While reduced pressures can be employed in the operation of this process, very satisfactory operation is at pressures of about 380 mm. Hg (one-half atmosphere). In operation at lower pressures, the amount of acetic acid in the azeotropic mixtures decreases to a point where large amounts of the substituted benzene azetroping agent are required which increases the cost of operations.

The distillation can be readily conducted in batch, semi-continuous, or continuous operation. In batch operation, it is advantageous to add from about 33 percent to about 80 percent of the total amount of substituted benzene entraining agent to be used in the still kettle for an initial distillation and after most of this has been distilled over, to add the remainder of the substituted benzene to the mixture undergoing distillation.

In continuous operation of this process employing a still column, the substituted benzene preferably is added continuously at or above the place at which the acetic acid-dimethylacetamide mixture is introduced, at a rate somewhat in excess of the amount required to form the azeotropic mixture with the acetic acid in the mixture being fed to the column. The kettle temperature should be maintained at a temperature above the boiling point of the entraining agent but preferably below the boiling point of the dimethylacetamide.

Figure 1:
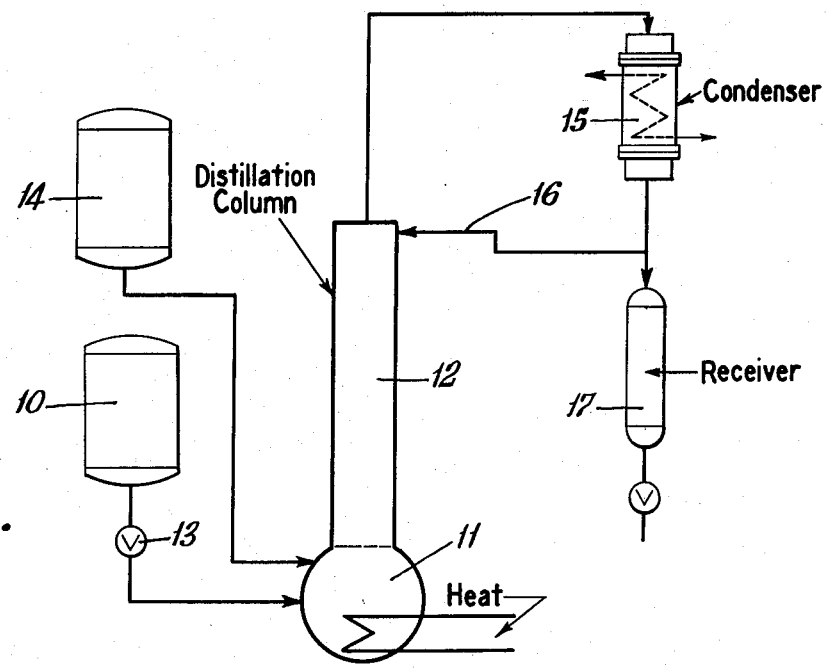
Fig. 1 represents operation of this process on a batch scale or for semi-continuous operation.

In reference to Fig. 1, the feed of substituted benzene in feed tank 10 to the still kettle 11 attached to the bottom of the rectification column 12 is controlled by valve 13. As desired, the substituted benzene can all be added at once or in several batches, or continuously to the still kettle 11 during the rectification. The mixture to be distilled, i.e. acetic acid and N,N-dimethylacetamide is added to the still kettle 11 from feed tank 14 preferably in one batch or if desired in several small batches. The heat applied to the still kettle 11 vaporizes the constant-boiling mixture of acetic acid and substituted benzene which is removed overhead and condensed in condenser 15. A portion of the condensed constant-boiling mixture is advantageously refluxed back to near the top of the distillation column 12 by line 16, and the remainder collected in receiver 17.

Distillation is continued until substantially all the acetic acid is removed from the mixture in the still kettle 11 or at least is reduced to a value of less than about 0.05 percent. The amount of acid removed is determined by the amount of substituted benzene added as hereinbefore described. Further rectification by continued heating to still kettle 11 removes the excess substituted benzene from the N,N-dimethylacetamide which can then be removed from the still kettle 11 as substantially purified. Further purification to remove high boiling impurities can be conducted in separate distillation equipment or in the same equipment at higher temperatures at reduced pressures to distill over the N,N-dimethylacetamide as a pure product.

Figure 2:
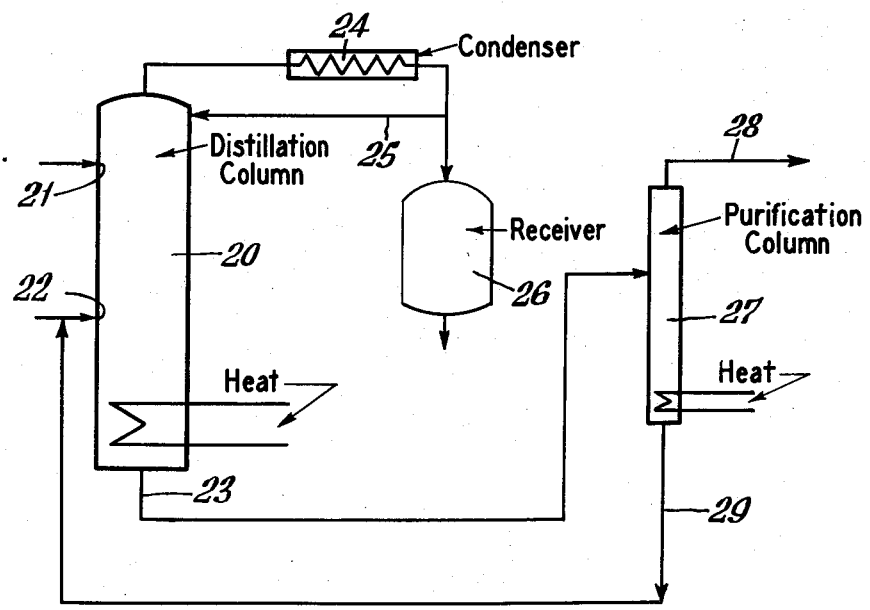
Fig. 2 illustrates the continuous operation of the process of this invention.

In reference to Fig. 2, showing continuous operation of this process, the substituted benzene is continuously fed to the distillation column 20 at a point 21 somewhat above the point for the continuous addition of the mixture of acetic acid and N,N-dimethylacetamide 22. The feed of the substituted benzene and of the mixture is so adjusted in accordance to the heating capacity of the column and separation efficiency such that substantially all of the acetic acid in the mixture is removed overhead as a constant-boiling mixture with the substituted benzene. Heat is applied to column 20 which is maintained at a temperature above the boiling point of the substituted benzene so that the N,N-dimethylacetamide removed by line 23 from the still kettle is free of excess substituted benzene as well as relatively free of acetic acid.

The constant-boiling mixture vaporized in the distillation column 20 is removed overhead and condensed in condenser 24. A portion of the condensed constant boiling mixture is refluxed back to the column by line 25 and the remainder fed to receiver 26 for separation and reuse of the substituted benzene if desired.

The acid-free N,N-dimethylacetamide removed by line 23 from the bottom of column 20 can be further purified by feeding to a separate purification column 27 which is operated at a temperature above the boilig point of the dimethylacetamide. The pure N,N-dimethylacetamide is removed as overhead 28 from this column 27 and the higher boiling components 29 removed as bottoms and can be fed back to point 22 in the distillation.

The following examples will serve to illustrate the process of this invention.

*Example 1*

Five hundred grams of a constant boiling mixture of N,N-dimethylacetamide and acetic acid containing 29.6 percent acetic acid was charged to a still kettle which was fitted with a fractional distillation column packed with 34 inches of protruded metal packing (perforated stainless steel half-cylinders) which had a capacity of 17 theoretical plates. To this kettle there was also added 400 grams of ethylbenzene (80 percent by weight of the constant boiling mixture) and heat was applied to the kettle mixture. Distillate was recovered to a head temperature of 128° C. (kettle temperature 155° C.) and additional ethylbenzene was fed to the still kettle at a rate of 6–7 ml. per minute. Distillation was continued in this manner for about three hours (head temperature rising to 135° C.) and 98.5 percent of the acid in the charge was thereby removed. A total of 866 grams of additional ethylbenzene (about 585 percent of the acetic acid in the original mixture) was employed in the distillation.

After removal of the ethylbenzene three hundred grams of N,N-dimethylacetamide was recovered by distillation of the contents of the still kettle at 85° C.–86° C. and 50 mm. mercury pressure. The purified N,N-dimethylacetamide contained only 0.013 percent acetic acid.

*Example 2*

Five hundred grams of a constant boiling mixture of

N,N-dimethylacetamide and acetic acid containing 22 percent acetic acid was charged to a still kettle which was fitted with a fractional distillation column packed with 34 inches of protruded metal packing having a capacity of 17 theoretical plates. To this kettle there was added 500 grams of toluene. Heat was applied and the mixture was distilled at atmospheric pressure. Distillate containing the acetic acid and toluene was removed at a head temperature of 105° C. to 109° C. while continuously adding additional toluene to the kettle at a rate about equivalent to the rate at which it was being removed in the distillate, i.e. about 230–240 grams per hour. During the distillation, the kettle temperature was maintained at 120° C. to 122° C. Operation was continued in this manner for about 15 hours, after which time the acid content in the kettle was reduced to about 4.4 percent. An additional 14 grams of acetic acid were removed from the mixture by further distillation with toluene, after which the dimethylacetamide was distilled over from the residue at a temperature of 83–85° C. and 50 mm. Hg pressure. The recovered dimethylacetamide contained only 0.0064 percent acetic acid and was about 76 percent of that contained in the kettle.

The dimethylacetamide in the residue from the distillation was recovered by repeating the toluene distillation to remove more acid. The residue can also be recycled in the process with the addition of the crude amide-acid mixture.

Example 3

Five hundred grams of a constant boiling mixture of N,N-dimethylacetamide and acetic acid, containing 29.9 percent (149.5 grams) of acetic acid, was charged to the still kettle as in Example 1 and 500 grams of chlorobenzene were added. Heat was applied and the mixture was distilled at atmospheric pressure, recovering overhead the acetic acid and chlorobenzene. The kettle temperature was maintained at 145° C.–150° C. and the head temperature was 115° C.–131° C. during the distillation. After about six hours, most of the original chlorobenzene had been distilled over and 1800 grams of additional chlorobenzene was added. Kettle temperature was again maintained at about 145° C.–150° C. and distillation was continued to remove the remainder of the acetic acid and chlorobenzene. Total time of distillation was about 20 hours.

The residue from this distillation was then distilled at the reduced pressure of 50 mm. mercury at 85° C. to recover the N,N-dimethylacetamide. About 316 grams of N,N-dimethylacetamide (about 90 percent of that contained in the charge) was recovered, which contained about 0.007 percent acetic acid.

Example 4

Five hundred grams of a constant boiling mixture of N,N-dimethylacetamide and acetic acid containing 29.9 percent acid, was charged to the still kettle as described in Example 1, and 500 grams of a mixture of ortho-, meta-, and para-xylenes was added. Heat was applied and the mixture was distilled at atmospheric pressure, maintaining a head temperature between 107° C. and 136° C. during the distillation. After a substantial part of the xylene was removed in the distillate, an additional 220 grams of xylene was added and distillation was continued under the same conditions to remove the remainder of the acetic acid and xylene. Total time of distillation was about 10 hours.

The residue of this distillation was then distilled at a temperature of about 85° C. at 50 mm. mercury pressure yielding N,N-dimethylacetamide containing about 0.007 percent acetic acid in a yield of about 88 percent of the dimethylacetamide contained in the charge.

Example 5

Five hundred grams of a constant boiling mixture of N,N-dimethylacetamide and acetic acid containing 29.6 percent acetic acid were charged to a still kettle fitted with a fractional distillation column packed with 34 inches of protruded metal packing having a capacity of about 17 theoretical plates. To this kettle there was added 400 grams of ethylbenzene (80 percent of the total charge), heat was applied, and the mixture was distilled at atmospheric pressure, and a head temperature of 93° C. to 113° C. A fraction taken at a vapor temperature from 115° C. to 133° C. amounting to about 47 percent of the total weight of the mixture in the still kettle contained 26.1 percent acetic acid. This corresponds to about 75 percent of the acid in the original amide-acid mixture. A fraction taken at a vapor temperature between 133° C. and 134° C. amounted to about 6.5 percent of the total charge in the kettle, and contained only 1.35 percent acetic acid.

Seven hundred grams of water were then fed to the still kettle to remove the rest of the ethylbenzene and the residue was distilled at 160° C. and 760 mm. mercury pressure to recover the N,N-dimethylacetamide. The purified dimethylacetamide contained only a slight amount of acetic acid and was recovered in a yield of about 100 percent of that contained in the original mixture.

I claim:

1. A method for the separation of acetic acid from a hydrogen bonded mixture of N,N-dimethylacetamide and acetic acid which includes the steps of adding to the said mixture a non-polar substituted benzene selected from the group consisting of chlorobenzene, and lower alkyl substituted benzenes in which the total number of carbon atoms in the alkyl substituents is no greater than 2, heating the mixture to a temperature sufficient to vaporize the acetic acid and substituted benzene and recovering the N,N-dimethylacetamide substantially free of acetic acid from the distillation residue.

2. A process according to claim 1 wherein the substituted benzene is chlorobenzene.

3. A process according to claim 1 wherein the substituted benzene is toluene.

4. A process according to claim 1 wherein the substituted benzene is ethylbenzene.

5. A process according to claim 1 wherein the substituted benzene is xylene.

6. A method for the recovery of N,N-dimethyl-acetamide from a hydrogen-bonded mixture of the N,N-dimethylacetamide and acetic acid, which includes the steps of adding a substituted benzene selected from the class consisting of chlorobenzene, and the lower alkyl substituted benzenes in which the total number of carbon atoms in the alkyl substituents is no greater than 2, to the said mixture in an amount at least sufficient to form an azeotropic mixture with substantially all of the acetic acid in the mixture, heating the resultant mixture to a temperature at least sufficient to vaporize the acetic acid-substituted benzene azeotrope, removing overhead the said acetic acid and substituted benzene and recovering the N,N-dimethylacetamide substantially free of acetic acid from the residue by distillation.

7. A continuous method for the separation of acetic acid from a hydrogen-bonded mixture of the N,N-dimethylacetamide and acetic acid which includes the steps of continuously feeding the said mixture to a distillation column while adding a substituted benzene selected from the class consisting of chlorobenzene, and the lower alkyl substituted benzenes in which the total number of carbon atoms in the alkyl substituents is no greater than 2 to the column at a rate at least sufficient to form an azeotropic mixture with substantially all the acetic acid in the feed mixture, vaporizing and removing the said substituted benzene and acetic acid, and recovering the N,N-dimethylacetamide substantially free of acetic acid from the bottom of said column.

8. A process according to claim 7 wherein the substituted benzene is ethylbenzene.

9. A process according to claim 7 wherein the substituted benzene is chlorobenzene.

10. A process according to claim 7 wherein the substituted benzene is toluene.

11. A process according to claim 7 wherein the substituted benzene is xylene.

12. A continuous method for the recovery and purification of N,N-dimethylacetamide from a hydrogen-bonded mixture of the N,N-dimethylacetamide and acetic acid, which includes the steps of continuously feeding said mixture to a distillation column while continuously adding a substituted benzene selected from the class consisting of chlorobenzene, and the lower alkyl substituted benzenes in which the total number of carbon atoms in the alkyl substituents is no greater than 2 to the column in amounts of from one to six times the amount of acetic acid in the mixture, maintaining a head temperature in the column of at least about 100° C. and the bottom of the column at a temperature above the boiling point of the substituted benzene-acetic acid azeotropic mixture, removing overhead the said substituted benzene and acetic acid, and recovering the N,N-dimethylacetamide substantially free of acetic acid by distilling the residue of the bottom of said distillation column.

13. A method for the separation of acetic acid from a hydrogen-bonded mixture of N,N-dimethylacetamide and acetic acid which includes the step of vaporizing substantially all the acetic acid from the mixture as an azeotrope with a substituted benzene selected from the class consisting of chlorobenzene, and the lower alkyl substituted benzenes in which the total number of carbon atoms in the alkyl substituents is no greater than 2.

References Cited in the file of this patent

UNITED STATES PATENTS

| | | |
|---|---|---|
| 2,403,576 | Bradley | July 9, 1946 |
| 2,411,567 | Wotherspoon | Nov. 26, 1946 |
| 2,423,545 | Aeschbach | July 8, 1947 |
| 2,602,817 | Heider | July 8, 1952 |
| 2,606,207 | Heider | Aug. 5, 1952 |
| 2,667,502 | Steitz | Jan. 26, 1954 |
| 2,667,511 | Downing | Jan. 26, 1954 |

FOREIGN PATENTS

| | | |
|---|---|---|
| 719,792 | Great Britain | Dec. 8, 1954 |
| 751,961 | Great Britain | July 4, 1956 |

OTHER REFERENCES

Horsley: "Azeotropic Data," June 1952 (pages 47–49), Div. 25.